United States Patent [19]

Isgur et al.

[11] 4,442,259
[45] Apr. 10, 1984

[54] AQUEOUS-BASED POLYURETHANE COMPOSITIONS AND METHOD OF PREPARATION

[75] Inventors: Irving E. Isgur, Framingham; William D. DelVecchio, Randolph, both of Mass.

[73] Assignee: W. R. Grace & Co., Cambridge, Mass.

[21] Appl. No.: 371,631

[22] Filed: Apr. 26, 1982

[51] Int. Cl.$^3$ ............................................. C08L 75/00
[52] U.S. Cl. .................................... 524/839; 524/591
[58] Field of Search ................................ 524/839, 591

[56] References Cited

U.S. PATENT DOCUMENTS

| | | | |
|---|---|---|---|
| 3,373,143 | 3/1968 | Chilvers et al. | 528/61 |
| 3,428,609 | 2/1969 | Chilvers et al. | 528/65 |
| 3,733,310 | 5/1973 | Aitken | 528/65 |
| 3,835,081 | 9/1974 | Remley | 524/839 |
| 3,948,847 | 4/1976 | Aitken et al. | 523/305 |
| 4,137,200 | 1/1979 | Wood et al. | 521/159 |
| 4,293,679 | 10/1981 | Cogliano | 524/591 |
| 4,322,327 | 3/1982 | Yoshimura et al. | 524/507 |

FOREIGN PATENT DOCUMENTS

| | | | |
|---|---|---|---|
| 9760 | 4/1980 | European Pat. Off. | 524/839 |
| 49-14155 | 4/1974 | Japan | 524/839 |
| 1253534 | 11/1971 | United Kingdom . | |
| 1356679 | 6/1974 | United Kingdom . | |
| 1364866 | 8/1974 | United Kingdom . | |
| 1470411 | 4/1977 | United Kingdom . | |

OTHER PUBLICATIONS

"Adhesion 3", K. W. Allen ed., Applied Science Publishers Ltd., London, pp. 159–161.
Polyurethanes Chemistry & Technology, Saunders & Frisch, pp. 485–490.

*Primary Examiner*—Joseph L. Schofer
*Assistant Examiner*—N. Sarofim
*Attorney, Agent, or Firm*—John J. Wasatonic; William L. Baker

[57] ABSTRACT

Aqueous-based polyurethane elastomer compositions which can be used as adhesives and a method of preparing same are described. The polyurethane compositions are prepared by chain extending an isocyanate-terminated urethane prepolymer with an equivalent excess of water in the presence of a monofunctional isocyanate group blocking agent to provide a reaction mixture having a desired adhesive capability and thereafter adding additional blocking agent to the reaction mixture in an equivalent amount at least substantially equal to the remaining equivalent amount of unreacted isocyanate groups in the prepolymer.

26 Claims, No Drawings ns259

AQUEOUS-BASED POLYURETHANE COMPOSITIONS AND METHOD OF PREPARATION

BACKGROUND OF THE INVENTION

This invention relates to polyurethane compositions and their method of preparation. More particularly, this invention relates to coldseal, aqueous-based polyurethane adhesive compositions prepared by controlled chain extension of urethane prepolymers with an excess of water.

The reaction of water with urethane prepolymers to prepare polyurethane foams is well known. The water reacts with isocyanate groups in the prepolymer to provide an unstable carbamic acid which decomposes to an amine with elimination of carbon dioxide. The amine, in turn, reacts with other isocyanate groups in the prepolymer to form urea linkages and effect cross-linking or chain extension of the prepolymer. The resultant viscosity increase results in entrapment of the liberated carbon dioxide with eventual formation of the desired foam.

Certain reactions of water with urethane prepolymers to provide adhesive compositions containing polyurethane elastomers are also known. In the preparation of such compositions, foaming due to the combination of carbon dioxide evolution and viscosity increase is highly undesirable. In order to minimize or avoid foaming, the water has been used in controlled small amounts, approximately equal to or less than an equivalent amount based on the isocyanate content of the prepolymer, and the reaction has been conducted in the presence of a relatively large quantity of an inert organic solvent. The reaction tends to be lengthy, due to the relatively small amount and low concentration of water and the adhesive composition is produced as an organic solvent solution.

From a process standpoint, the above method is unsatisfactory, not only with respect to reaction time but also with respect to the cost and handling of large volumes of organic solvents. From a product standpoint, the organic solvent base of the composition can be undesirable with respect to both cost and environmental and safety factors.

SUMMARY OF THE PRESENT INVENTION

The present invention relates to aqueous-based polyurethane elastomer compositions which can be used as adhesives and to a method of preparing same. In its method aspects, the present invention provides a method of preparing an aqueous-based polyurethane adhesive composition wherein an isocyanate-terminated urethane prepolymer is reacted with an excess amount of water in a controlled manner by conducting the reaction in the presence of a monofunctional isocyanate group blocking agent. It has been found that the reaction rate and, hence, the rate of carbon dioxide evolution and viscosity increase are controlled by use of the blocking agent such that, notwithstanding the excess quantity of water, foam formation is avoided and an aqueous-based solution having an adhesive capability is provided. When the reaction mixture has achieved a desired adhesive capability, an additional amount of the monofunctional blocking agent or an amount of a second isocyanate group blocking agent which is sufficient to block the remaining unreacted isocyanate groups in the prepolymer is added, thus providing a composition of this invention.

Process advantages provided by the present method include the avoidance of large quantities or proportions of undesirable organic solvents in both the preparative procedure and the final product and desirable reaction times inasmuch as the excess of water promotes a relatively rapid reaction, notwithstanding the presence of the blocking agent.

In its product aspects, the present invention relates to the compositions provided by the present process. It has been found that the compositions produced by the present process are film-forming materials which can be used as adhesives for bonding a variety of substrates. The compositions are aqueous-based, i.e., comprise water or a mixture of water and a miscible cosolvent as a solvent or carrier, and, in general, form high strength bonds without the need of a curing step after application.

DETAILED DESCRIPTION OF THE INVENTION

The method of this invention comprises the steps of reacting an isocyanate-terminated urethane prepolymer with an equivalent excess of water, based on the isocyanate content of the prepolymer, in the presence of a monofunctional isocyanate group blocking agent, until the reaction mixture acquires a desired adhesive capability and, when such capability has been attained, adding additional monofunctional blocking agent or a second isocyanate group blocking agent to the reaction mixture in an equivalent amount at least substantially equal to the remaining equivalent amount of unreacted isocyanate groups in the prepolymer. The reaction of water with the isocyanate groups in the prepolymer is believed to effect chain extension or cross-linking by the usual mechanism, i.e., formation of an unstable carbamic acid which decomposes to an amine with loss of carbon dioxide followed by reaction of the amine with another isocyanate group, and the reaction is hereafter referred to as chain extension. In general, the chain extension is conducted using at least a two-fold equivalent excess of water. More preferably, a five-fold or greater excess is used. The water thus functions not only as a reactant, i.e. as the chain extension initiator, but also functions as a solvent or diluent which, in effect, facilitates viscosity control and the escape of liberated carbon dioxide from the reaction mixture.

The prepolymer used in the present method can be any of the known types of isocyanate-terminated urethane prepolymers, provided that it can be satisfactorily dissolved or suspended in the reaction medium and reacted with the water. Urethane prepolymers are prepared by the well known method of reacting a polyol with an aliphatic or aromatic polyisocyanate. Excess polyisocyanate is usually employed to insure reaction of all the polyol hydroxyl groups and to minimize cross-linking due to reaction of two or more isocyanate groups of the same molecule. Suitable prepolymers for use herein include those formed from polyoxyalkylene polyols and polyester polyols. Prepolymers prepared from polyoxyalkylene polyols are preferred, and particularly those having a molecular weight of about 200 to about 10,000. The hydroxyl functionality of the polyol and, thus, of the corresponding isocyanate-terminated prepolymer can be from about 2 to 4 and is preferably from about 2 to about 2.5.

The prepolymers can be prepared by reaction of a single polyol with a single polyisocyanate or by reaction of mixtures of either type of reagent. Thus, a mixture of polyols can be reacted with a polyisocyanate or mixture of polyisocyanates to provide a prepolymer composition. In a preferred embodiment, the polyol or one or more of the polyols of a mixture is of a hydrophilic nature, such that the prepolymer prepared therefrom, and chain extended reaction products of the prepolymer are also hydrophilic. The hydrophilic prepolymers are more readily solubilized in aqueous reaction media and, accordingly, more reactive with water, thus facilitating the chain extension reaction of the present process. In addition, the hydrophilic chain extended reaction products tend to form more stable aqueous-based solutions which are less prone to phase separation or coagulation.

The degree of hydrophilicity which is desired or necessary in the polyol and prepolymer will vary with such factors as the nature of the polyisocyanate which is reacted with the polyol, the intended degree of chain extension of the prepolymer, and the use of cosolvents in addition to water for purposes of chain extension or as a component of the carrier for the resultant composition. However, where a mixture of hydrophilic and hydrophobic polyols is employed in the prepolymer preparation, it is normally preferred that the hydrophilic polyol(s) constitute at least 15%, on a mole basis, of the mixture and, more preferably, at least 75%.

Especially preferred hydrophilic polyols for preparing prepolymers used herein are the hydrophilic polyoxyethylene polyols, i.e., hydrophilic polyols comprising recurring oxyethylene —$CH_2$-$CH_2$-O— units. These polyols, and prepolymers prepared therefrom, can exhibit an especially high degree of hydrophilicity, particularily those comprising at least 20 mole percent oxyethylene units. Accordingly, they are especially useful in the present process, particularily from the standpoint of water solubility and reactivity. The advantages attendant to the hydrophilicity of the polyoxyethylene polyols also extend to the compositions of this invention in that the compositions can be prepared to have a relatively high solids content, e.g. solids as high as 60% on a weight basis, and possess favorable stability characteristics, i.e., minimal or no tendency to form gels or coagulates on standing or to undergo phase separation. The compositions also can be readily diluted with polar solvents such as water and alcohols.

It should be recognized that the advantages realized by the use of hydrophilic polyoxyethylene polyols and prepolymers are obtained without the use of surfactants, such as are commonly necessary for reactions of more hydrophobic prepolymers, thus avoiding the presence of such materials and any effects which they might have on the present method or compositions.

Polyoxyethylene polyols are prepared by addition polymerization of ethylene oxide in the presence of a polymerization initiator such as ethylene glycol or glycerol. The polyoxyethylene polyols used in preparing prepolymers for the present process can be essentially homopolymeric, essentially comprising only recurring oxyethylene units, or copolymeric, comprising other recurring units provided by copolymerization of ethylene oxide with other alkylene oxides. Where the polyols are copolymers, the recurring oxyethylene units should be present in sufficient amount to provide a satisfactory hydrophilic/hydrophobic balance and, as indicated above, an oxyethylene content of at least 20 mole percent is preferred. The homopolymeric and copolymeric polyoxyethylene polyols can be admixed with other polyols, including hydrophobic polyols, prior to reaction with the polyisocyanate, again provided that a satisfactory hydrophilic/hydrophobic balance is provided.

It should be recognized that the use of excess polyisocyanate in preparing the prepolymers will generally provide a prepolymer composition containing unreacted polyisocyanate. Accordingly, as used herein, the term "prepolymer" is intended to include prepolymer compositions containing unreacted polyisocyanate and, similarly, reference to chain extension of a prepolymer is intended to include reaction of the isocyanate groups of such unreacted polyisocyanate.

Although polyisocyanates having a functionality of 3 or more can be used in preparation of prepolymers used herein, it is generally preferred to employ diisocyanates. Both aliphatic and aromatic diisocyanates can be used. Suitable diisocyanates include 1,6-hexamethylene diisocyanate, isophorone diisocyanate, 2,2,4-trimethyl-1,6-hexane diisocyanate, trimethylene diisocyanate, toluene-2,4-diisocyanate, toluene-2,6-diisocyanate, diphenylmethane-4,4'-diisocyanate, biphenyl-4,4'-diisocyanate, and 3,3'-dimethyl-4,4'-diisocyanate-1,1'-biphenyl.

Aliphatic polyisocyanates are preferred insofar as the resultant prepolymers generally react more slowly with water than those prepared from aromatic polyisocyanates and, thus, permit the better process control and, possibly, the use of less monofunctional blocking agent. However, from the standpoint of minimizing reaction time, prepolymers prepared from aromatic polyisocyanates are preferred, albeit in the presence of possibly a greater amount of blocking agent. Other considerations which might effect the choice of a particular polyisocyanate include the hydrophobic/hydrophilic properties imparted to the resultant prepolymer and factors such as cost, availability, and toxicity.

In general, the polyol(s) and polyisocyanate(s) may be reacted according to known methods to prepare the prepolymers and the method of prepolymer preparation does not, per se, constitute a part of this invention.

The monofunctional blocking agent used to control chain extension of the prepolymer can be any compound capable of reacting with and blocking the isocyanate group so as to retard or prevent its reaction with water. As used herein, the term "monofunctional" refers to blocking compounds having one isocyanate-reactive group and compounds having two or more reactive groups of different reactivity towards the isocyanate group. With the latter compounds, the difference in reactivity should be such that only one of the reactive groups reacts with an isocyanate group during the course of the reaction. Thus, in effect, a monofunctional blocking agent of this invention is any blocking agent which is substantially incapable of effecting crosslinking or chain extension of the prepolymer. A variety of such blocking agents are known and can be used herein. As examples, there may be mentioned alcohols such as methanol, ethanol, isopropanol, and phenol; primary or secondary monoamines such as methylamine, ethylamine, and isopropylamine; oximes such as acetone oxime, butanone oxime, and cyclohexanone oxime; and alkanol amines such as ethanol amine.

The amount of blocking agent used for reaction control can vary over a wide range depending on such factors as the comparative reactivities of water and the blocking agent with the prepolymer, the desired rate of reaction, and the desired final viscosity. In general, where the reactivity of the blocking agent with the prepolymer is greater than that of water, e.g., as with most amines and oximes, the blocking agent should be used in a less than equivalent amount, based on the isocyanate content of the prepolymer, in order to insure the availability of free isocyanate groups for reaction with the water. However, the blocking agent should also be present in sufficient amount to provide adequate control of the prepolymer-water reaction. In such cases, an acceptable or optimal amount of blocking agent is normally determined empirically.

Where the reactivity of the blocking agent with the prepolymer is less than that of water, e.g., as with most alcoholic blocking agents, greater latitude is generally available in the amount of blocking agent which can be used. The lower reactivity of the blocking agent permits the use of an equivalent excess of same without total inhibition of the chain extension reaction and, normally, it is preferred to employ such as excess. The alcoholic blocking agents such as methanol, ethanol, and isopropanol are thus especially useful in the present invention in that they can be used in excess, usually from the beginning of the reaction, and accordingly function not only as blocking agents but also as diluents or cosolvents. Alcohols are preferred as diluents or cosolvents in the product compositions in that they provide volatility for adhesive applications and are more acceptable from an environmental standpoint than many of the organic solvents heretofore used in polyurethane adhesive compositions, e.g., ethyl acetate or toluene.

The blocking agent can be introduced into the reaction vessel during or prior to the chain extension and any of a number of variant practices can be employed as necessary to achieve acceptable reaction control. For example, where the prepolymer is highly reactive, it is often preferred to add at least a portion of the blocking agent prior to the introduction of water. The blocking agent can also be added gradually in a continuous fashion or in discreet portions as the reaction proceeds. With alcoholic blocking agents, it may prove advantageous to add the entire amount which is to be used prior to or at the onset of chain extension. This practice can result in better viscosity control, presumably as a result of more extensive isocyanate blocking or initially maximal dilution.

Where the blocking agent is added gradually or in portions, the latter amounts which are added may provide a sufficient quantity of blocking agent to effect blocking of the remaining unreacted isocyanate groups in the prepolymer in accordance with the present process. The effectiveness of this procedural variation in terminating chain extension may be aided by decreasing the temperature of the reaction mixture subsequent to completing the blocking agent addition.

In the present process, two or more monofunctional blocking agents can be used in combination. A useful combination consists of an alcohol and a more reactive blocking agent such as an oxime. In such a combination, the alcohol may provide some blocking function but primarily is used as a diluent or cosolvent while the more reactive blocking agent provides the major proportion of isocyanate blocking.

The chain extension reaction can be conducted at room temperature or at elevated temperatures of up to about 100° C. In general, temperatures of about 40° C. to about 90° C. can be used to increase the reaction rate. Application of heat to the reaction may be particularly beneficial where the prepolymer has been prepared using an aliphatic polyisocyanate.

The chain extension reaction is allowed to proceed until the reaction mixture acquires a desired adhesive capability. The adhesive capability or, stated differently, the adhesive characteristics which are desired will generally be in terms of achieving optimal bonding strength, as determined for a given substrate or substrates, at workable viscosity levels. In the simplest procedure, the attainment of a desired adhesive capability is determined by monitoring the reaction mixture in a qualitative fashion, e.g., by removing samples and evaluating their adhesive properties by touch or elementary tests of adhesiveness between two substrates. In more refined procedures, the reaction mixture is monitored quantitatively, usually in terms of viscosity. It will be appreciated that the viscosity of the reaction mixture increases as the chain extension reaction proceeds. In general, sufficient correlation can be established between the viscosity of the reaction mixture and its adhesive capability to permit the use of viscosity measurements as a means of monitoring the reaction and determining the point at which the additional blocking agent is to be added. Useful viscosities can vary over a wide range and may depend on such factors as the nature of the polyurethane, the percent solids of the reaction mixture, and the temperature of the reaction mixture.

In addition to alcohols, other cosolvents may be employed in the present process. These cosolvents should be miscible with water or a given water-alcohol mixture and, unless intended for use as a monofunctional blocking agent, they should be inert to the isocyanate groups. Preferred cosolvents are volatile solvents which can facilitate drying of the adhesive compositions, e.g., acetone or methyl ethyl ketone. The cosolvent may be added prior to, during, or subsequent to chain extension.

When the desired viscosity and/or desired adhesive characteristics have been attained, additional monofunctional blocking agent, i.e., the blocking agent used for reaction control, or a second isocyanate group blocking agent is added to the reaction mixture in an amount at least substantially equal to the amount of unreacted isocyanate groups in the prepolymer, on an equivalent basis. It should be recognized that the amount of unreacted isocyanate groups remaining in the prepolymer when the desired viscosity or adhesive characteristics are attained will vary with the nature of the prepolymer and the degree of chain extension. Although this amount can be measured, thereby allowing calculation of the minimum quantity of additional blocking agent to be added, it is generally more convenient and satisfactory to forego such measurement and employ an excess amount of the blocking agent. By reaction of the additional blocking agent with the remaining isocyanate groups in the prepolymer, the chain extension reaction is terminated. The effectiveness of the blocking agent in terminating chain extension, i.e., the rate and extent of reaction with the remaining isocyanate groups, is promoted by utilization of an excess amount and, consistent with such increased effectiveness, the resultant compositons tend to have a longer shelf life. Reasonable excesses of the additional blocking agent, e.g., in the range of a 10% to 100% equivalent excess, in the adhesive compositions of this invention do not generally adversely effect the adhesive characteristics.

The additional blocking agent can be any of the aforementioned monofunctional blocking agents or it can be a polyfunctional blocking agent such as a diol, diamine, or dioxime. The additional blocking agent should be capable of forming a reaction product with the isocyanate which is substantially stable to water for reasonable periods of time at room temperature. Preferred blocking agents are the more reactive monofunctional materials such as the aforementioned oximes and amines. Ammonia is also a preferred material. Although alcohols can be used as the additional blocking agent, and are often added in excess for such purpose and for purposes of dilution, they are preferably employed in conjunction with a more reactive blocking agent in order to insure a maximum shelf life for the product. Various primary and secondary amines can be used in conjunction with the alcohol and ammonia is particularly useful in this regard.

The additional blocking agent can be added to the reaction mixture at any temperature up to about 100° C. Generally, it is added at approximately the same temperature used for chain extension.

In accordance with the product aspects of this invention, the polyurethane solutions obtained after introduction of the additional blocking agent can be employed as cold seal adhesives for bonding a variety of substrates. The polyurethane solutions which are obtained may be so used as is or, if desired, they may be diluted with water, an alcohol, or other miscible solvents. The solutions tend to be infinitely dilutable with alcohols and with water/alcohol mixtures containing about 50% or more by volume of alcohol. They can be diluted with water alone to a solids content of about 15% to 20% on a weight basis. Below about 15%, the polymer may begin to precipitate, but this may depend on the particular polymer and on the presence of cosolvents in the composition.

The adhesive compositions of this invention are aqueous based in that the adhesive carrier, i.e., the solvent, comprises water in substantial quantity. In general, the carrier comprises at least 10% water, by weight, and may consist of up to 75% water. The water content consists of that which is residual from the preparative reaction and any additional amount added thereafter.

Characterization of the present adhesive compositions as "cold seal" denotes the capability to bond substrates without heat curing of the polyurethane polymer. Curing by such other means as adding cross-linking reagents is also unnecessary. Substrates can be bonded at room temperature by conventional laminating methods. The adhesive compositions are applied as a coating to the substrate, dried to remove substantially all the water and any cosolvent, and the coating is then contacted with a second substrate to effect lamination and bonding. In a preferred practice, the adhesive is applied to both substrates, dried, and the respective coatings are then contacted. At least a minimal amount of pressure is used in contacting the substrates. The adhesive can be air dried or oven dried prior to lamination.

Substrates which can be bonded by the present compositions include paper, metals, polyurethane foams, and synthetic polymer sheets and fibers such as polyesters, polyamides, and polyalkylenes.

The present invention is further described in the following Examples wherein specific limitations are illustrative and not limitative.

EXAMPLE 1

100 grams of an isocyanate-terminated prepolymer prepared by reacting trimethylolpropane (TMOP) and polyethylene glycol having a molecular weight of about 1000 (PEG 1000) with toluene diisocyanate (TDI) in a molar ratio of 0.5:1.0:3.9, respectively, and a solution of 6 g. of acetone oxime in 20 g. of acetone were placed in a one liter flask at room temperature. The mixture was heated with stirring at about 35° C. for 10 minutes. 50 grams of demineralized water and 100 grams of ethanol were added and the reaction mixture stirred at room temperature for about ½ hour. The reaction mixture was periodically tested for adhesiveness during this time by removing small sample portions, at least partially drying the sample, and touch testing for "tack". Sufficient ammonium hydroxide was then added to bring the pH of the mixture to about 10. The resultant composition was a stable, low viscosity, clear solution analyzed to have 39.2% non-volatiles.

EXAMPLE 2

50 grams of demineralized water were added with stirring to 100 g. of an isocyanate-terminated prepolymer prepared by reacting TMOP and PEG 1000 with isophorone diisocyanate in a molar ratio of 0.13:1.0:3.1, respectively. After about 5 minutes of stirring at 30° C., an increase in viscosity was noted and some entrapment of the carbon dioxide which was generated occurred. A solution of 6 g. or acetone oxime in 50 g. of demineralized water was then added in portions of 10, 10, and 30 cc. over about 10 minutes. The temperature rose to 36° C. Three 25 g. portions of a solution of 10 g. of acetone oxime in 100 g. of ethanol were then added over about 15 minutes followed by addition of the remaining solution. The temperature decreased slightly during these additions and the reaction mixture was allowed to cool to room temperature of about 25° C. after the last addition. The resultant adhesive was a clear solution and had a non-volatiles content of 33.2%.

EXAMPLE 3

390 grams of the isocyanate-terminated prepolymer of Example 2 and 39.0 grams of demineralized water were placed in a 1 liter flask and heated to about 50° C. Carbon dioxide evolution and a viscosity increase occurred. After about 10 minutes, 390 grams of ethanol were slowly added to the reaction mixture over a period of about 2 hours maintaining the temperature at about 50° C. The mixture was periodically tested for adhesiveness during this time as in Example 1. The reaction mixture was then cooled over about ½ hour to a temperature of about 30° C. The resultant adhesive composition was clear and had a pH of about 6 and a viscosity of about 110 cps as measured by a Brookfield viscometer at 25° C. using a #1 spindle at 60 rpm.

EXAMPLE 4

The procedure of Example 3 was repeated except that sufficient ammonium hydroxide was added to the reaction mixture after the ethanol had been added to bring the pH to 9-10. The composition exhibited improved shelf stability as compared to the composition prepared in Example 3 and had similar adhesive characteristics.

EXAMPLE 5

100 grams of an isocyanate-terminated prepolymer prepared by reacting TMOP and PEG 1000 with TDI in a molar ratio of 0.5:1.0:4.0, 100 grams of ethyl alcohol, and 30 grams of demineralized water were mixed and stirred at room temperature. Carbon dioxide evolution occurred but the gas dissipated from the low viscosity reaction medium. The mixture was stirred and tested periodically for adhesiveness as in Example 1. After stirring for about 30 minutes, 50 grams of ethanol and sufficient diethanolamine were added to bring the pH to about 8. A stable, transparent solution was obtained which, when coated and dried, had adhesive properties.

EXAMPLE 6

The compositions prepared in Examples 1-3 were coated on high density polyethylene (HDPE) with a 3 mil. drawdown bar and air dried. The compositions were coated without being diluted. Laminates were prepared by bringing coated samples into contact, i.e., coating to coating, and by contacting a coated sample with an uncoated piece of HDPE. The laminates were rolled with a 5 pound roller at room temperature. For added substrate strength in testing, the laminates were backed with masking tape.

The laminates were cut into 1 inch strips and adhesion (bond strength) measurements were made on an Instron measuring machine. Measurements were made of the force required to initiate peel or "bond break" and the force required to maintain peel. The measurements in grams per linear inch, are set forth in the following table:

| Composition | Force to Initiate Peel | | Force to Maintain Peel | |
|---|---|---|---|---|
| | Coating to Coating | Coating to Uncoated | Coating to Coating | Coating to Uncoated |
| Example 1 | 830 | 345 | 250 | 150 |
| Example 2 | 415 | 200 | 250 | 80 |
| Example 3 | 345 | 300 | 320 | 250 |

What is claimed is:

1. A method of preparing an aqueous based polyurethane adhesive solution comprising the steps of:
   providing a reaction mixture comprising an isocyanate-terminated urethane prepolymer and an equivalent excess of water, based on the isocyanate content of said prepolymer;
   reacting said prepolymer and said water to effect chain extension of said prepolymer;
   controlling the rate of said chain extension by adding to said reaction mixture a monofunctional isocyanate group blocking agent and permitting reaction between said agent and isocyanate groups in said prepolymer;
   permitting said prepolymer and said water to react until said reaction mixture acquires a desired adhesive capability; and
   adding to said reaction mixture additional said monofunctional isocyanate group blocking agent or a second isocyanate group blocking agent in an amount at least substantially equal to the remaining unreacted isocyanate groups in said prepolymer on an equivalent basis.

2. A method of claim 1 wherein said equivalent excess of water is at least a two-fold excess.

3. A method of claim 1 wherein said prepolymer comprises the reaction product of a hydrophilic polyol and a polyisocyanate.

4. A method of claim 3 wherein said polyol is a polyoxyethylene polyol.

5. A method of claim 4 wherein said polyoxyethylene polyol is polyethylene glycol.

6. A method of claim 3 wherein said polyisocyanate is a diisocyanate.

7. A method of claim 1 wherein said monofunctional blocking agent is selected from the group consisting of alcohols, primary amines, secondary amines, oximes, and alkanol amines.

8. A method of claim 1 wherein said monofunctional blocking agent is less reactive with said prepolymer than water and an equivalent excess, based on the isocyanate content of said prepolymer, is used to control the rate of said chain extension.

9. A method of claim 8 wherein said monofunctional blocking agent is an alcohol.

10. A method of claim 9 wherein said alcohol is ethanol.

11. A method of claim 1 wherein said monofunctional blocking agent is more reactive with said prepolymer than water and less than an equivalent amount, based on the isocyanate content of said prepolymer, is added to control the rate of said chain extension.

12. A method of claim 11 wherein said blocking agent is an oxime.

13. A method of claim 1 wherein said additional monofunctional blocking agent or said second blocking agent is added in an equivalent excess based on the equivalents of said remaining unreacted isocyanate groups.

14. A method of claim 1 wherein said second isocyanate group blocking agent is selected from the group consisting of monofunctional and polyfunctional alcohols, primary amines, secondary amines, and oximes; alkanol amines; and ammonia.

15. A method of claim 14 wherein said second blocking agent comprises, in combination, a monofunctional alcohol and ammonia.

16. An aqueous based, cold seal, polyurethane adhesive solution prepared by a method comprising the steps of:
   providing a reaction mixture comprising an isocyanate-terminated urethane prepolymer and an equivalent excess of water, based on the isocyanate content of said prepolymer;
   reacting said prepolymer and said water to effect chain extension of said prepolymer;
   controlling the rate of said chain extension by adding to said reaction mixture a monofunctional isocyanate group blocking agent and permitting reaction between said agent and isocyanate groups in said prepolymer;
   permitting said prepolymer and said water to react until said reaction mixture acquires a desired adhesive capability; and
   adding to said reaction mixture additional said monofunctional isocyanate group blocking agent or a second isocyanate group blocking agent in an amount at least substantially equal to the remaining unreacted isocyanate groups in said prepolymer on an equivalent basis.

17. A composition of claim 16 wherein said equivalent excess of water is at least a two-fold excess.

18. A composition of claim 16 wherein said prepolymer comprises the reaction product of a hydrophilic polyoxyethylene polyol and a polyisocyanate.

19. A composition of claim 16 wherein said monofunctional blocking agent is selected from the group consisting of alcohols, primary amines, secondary amines, oximes, and alkanol amines.

20. A composition of claim 19 wherein said monofunctional blocking agent is an alcohol which is added in an equivalent excess, based on the isocyanate content of said prepolymer, to control the rate of said chain extension.

21. A composition of claim 16 wherein said additional monofunctional blocking agent or said second blocking agent is added in an equivalent excess, based on the equivalents of said remaining unreacted isocyanate groups.

22. A composition of claim 16 comprising, as a water-miscible cosolvent added prior to, during, or subsequent to reaction of said water and said prepolymer, methanol, ethanol, isopropanol, acetone, or methyl ethyl ketone.

23. A composition of claim 16 comprising a carrier solvent comprising at least 10% by weight of water.

24. A method of cold seal bonding a first substrate to a second substrate comprising the steps of:

coating a surface of said first substrate with an aqueous based, cold seal polyurethane adhesive composition prepared by a method comprising the steps of reacting an isocyanate-terminated urethane prepolymer with an equivalent excess of water, based on the isocyanate content of said prepolymer, in the presence of a monofunctional isocyanate group blocking agent; permitting said prepolymer and said water to react until the reaction mixture acquires a desired adhesive capability; and adding to said reaction mixture additional said monofunctional isocyanate group blocking agent or a second isocyanate group blocking agent in an amount at least substantially equal to the remaining unreacted isocyanate groups in said prepolymer on an equivalent basis;

drying the adhesive coating; and contacting said second substrate with said coating.

25. A method of claim 24 further comprising coating said adhesive composition on a surface of said second substrate, drying the adhesive coating on said second substrate, and contacting the respective adhesive coatings on said first and second substrates.

26. A method of claim 24 wherein said first and second substrates are selected from the group consisting of paper, metal, polyurethane foam, synthetic polymer sheets, and synthetic polymer fibers.

* * * * *